H. WILMS.
STREET INDICATOR FOR CARS.
APPLICATION FILED FEB. 28, 1911.
1,015,111.
Patented Jan. 16, 1912.
4 SHEETS—SHEET 1.
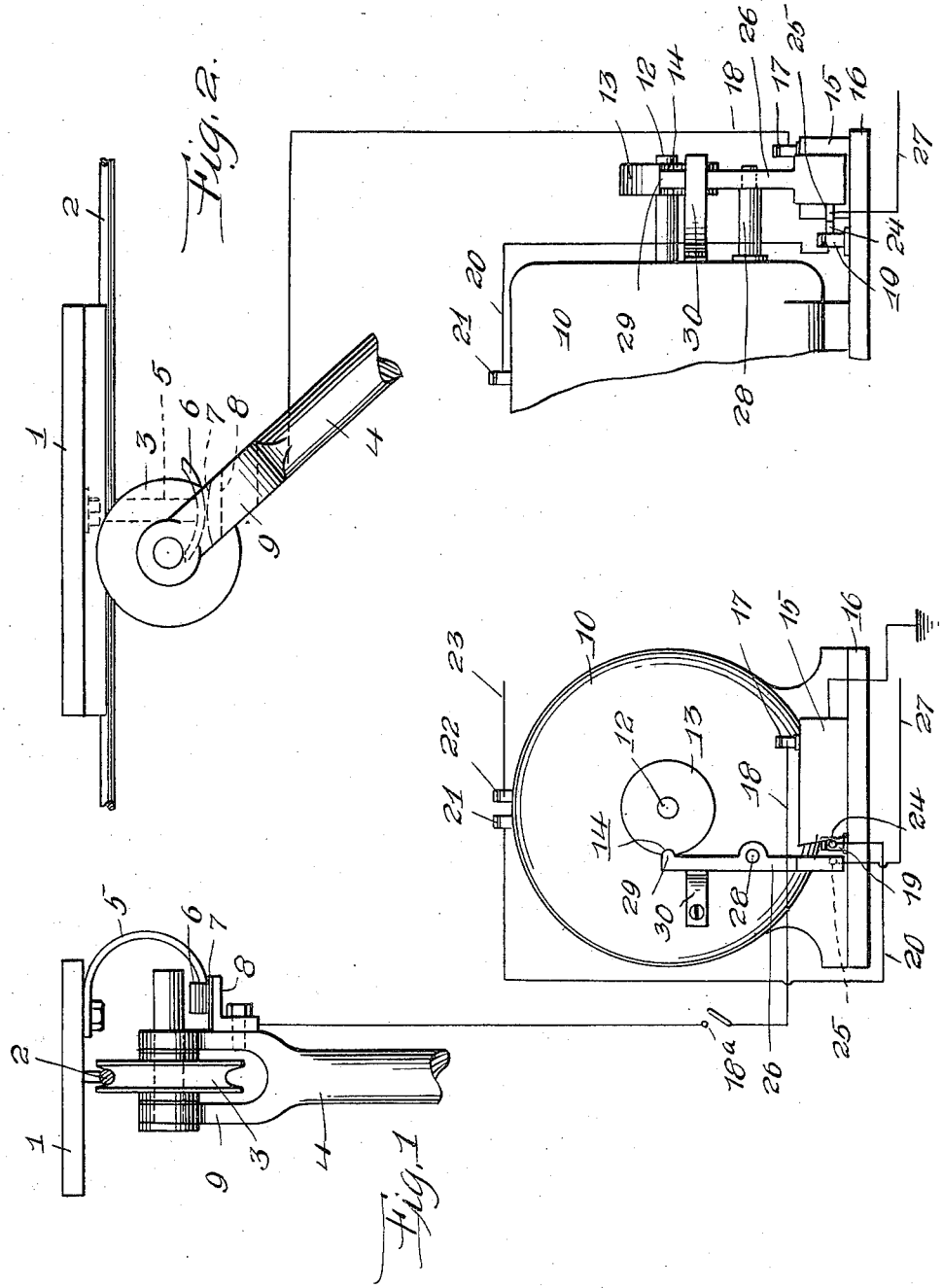

H. WILMS.
STREET INDICATOR FOR CARS.
APPLICATION FILED FEB. 28, 1911.
1,015,111.
Patented Jan. 16, 1912.
4 SHEETS—SHEET 2.
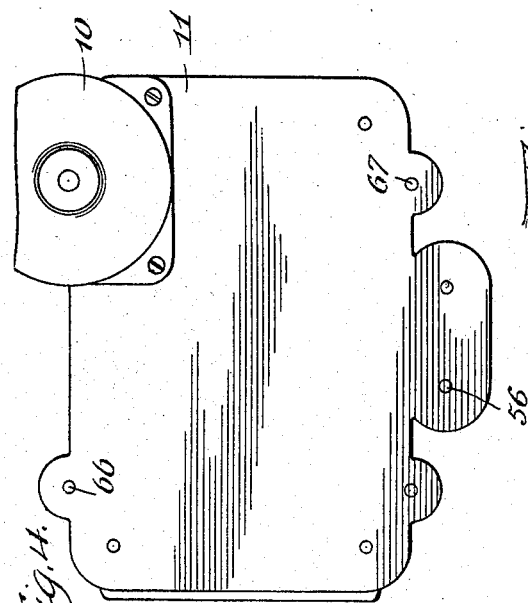
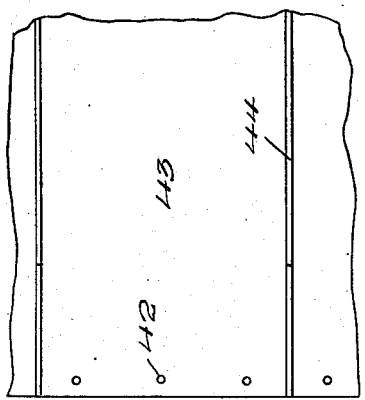
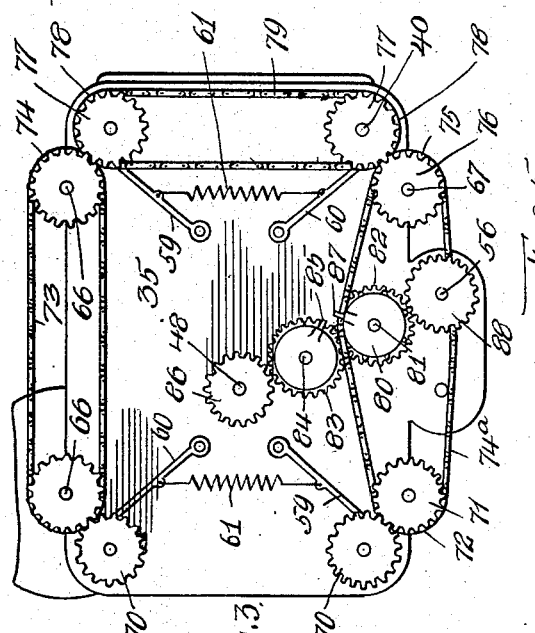
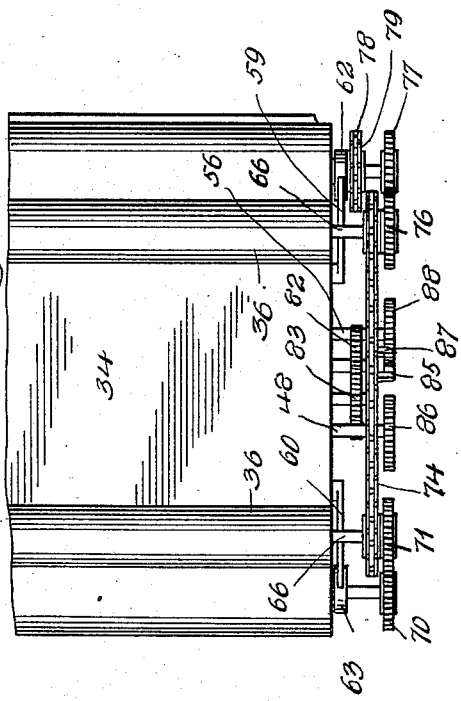
WITNESSES
Samuel Payne
K. H. Butler
INVENTOR
H. Wilms,
N. C. Evert & Co.
by Attorneys.

H. WILMS.
STREET INDICATOR FOR CARS.
APPLICATION FILED FEB. 28, 1911.
1,015,111.
Patented Jan. 16, 1912.
4 SHEETS—SHEET 3.
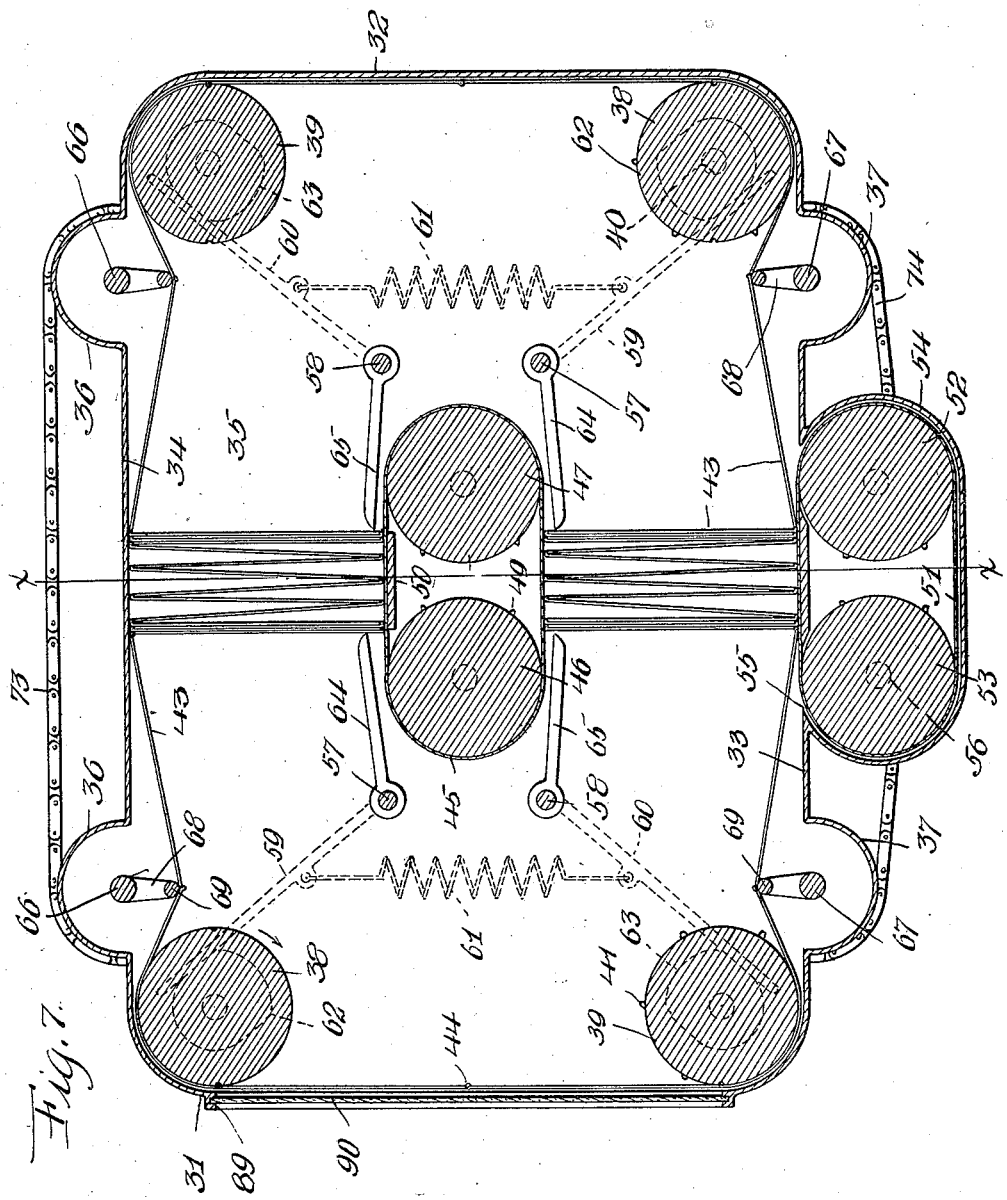
WITNESSES
INVENTOR
H. Wilms,

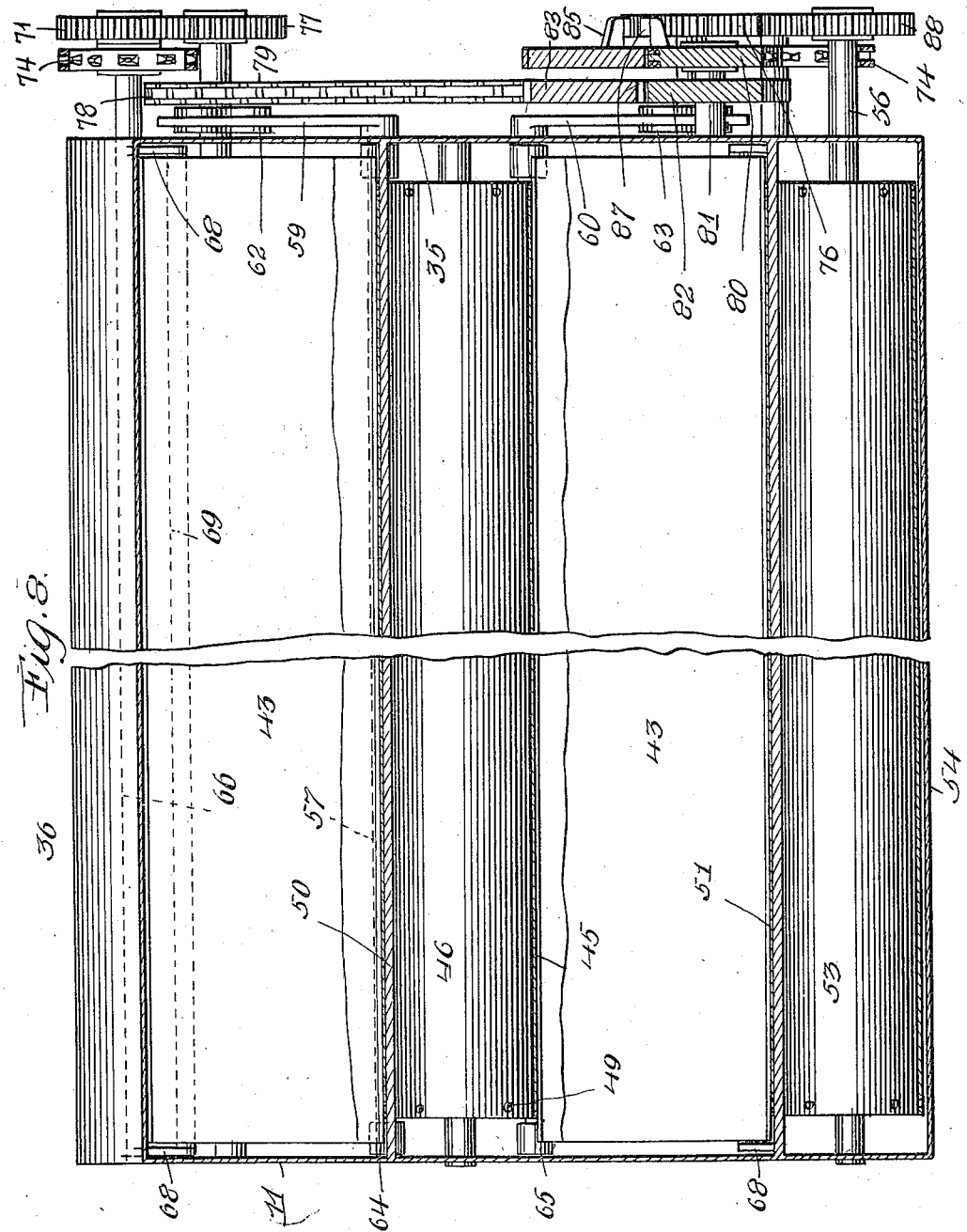

UNITED STATES PATENT OFFICE.

HERMANN WILMS, OF EAST PITTSBURGH, PENNSYLVANIA.

STREET-INDICATOR FOR CARS.

1,015,111. Specification of Letters Patent. Patented Jan. 16, 1912.

Application filed February 28, 1911. Serial No. 611,364.

*To all whom it may concern:*

Be it known that I, HERMANN WILMS, a subject of the Emperor of Germany, residing at East Pittsburgh, in the county of Allegheny and State of Pennsylvania, have invented certain new and useful Improvements in Street-Indicators for Cars, of which the following is a specification, reference being had therein to the accompanying drawing.

This invention relates to street indicators for cars, the indicator being particularly designed for electrically operated trolley systems.

The primary object of the invention is to provide a car with a device for automatically displaying the names of streets, avenues and stations prior to the car reaching such streets or stations, thereby giving passengers sufficient time to prepare for departure from the car and, furthermore, relieving the conductor of the car of the necessity of calling out the names of the streets and stations.

With the above and other objects in view the invention resides in a novel construction, combination and arrangement of parts to be hereinafter specifically described and then claimed.

Reference will now be had to the drawings wherein like numerals designate corresponding parts throughout the several views, in which:—

Figure 1 is a front elevation of a trolley attachment in connection with a motor. Fig. 2 is a side elevation of the same. Fig. 3 is a view of one end of the indicator. Fig. 4 is a view of the opposite end thereof. Fig. 5 is a plan of a portion of the indicator. Fig. 6 is a front elevation of a portion of an apron adapted to be used in the indicator. Fig. 7 is an enlarged cross sectional view, and Fig. 8 is a longitudinal sectional view of a portion of the same taken on the line X X of Fig. 7.

Reference numeral 1 denotes a hanger supporting a trolley wire 2 and adapted to travel upon this wire is a trolley wheel 3 revolubly supported by a trolley pole 4. The support 1 is provided with a depending curved arm 5 having a curved shoe 6 adapted to contact with the rounded surface 7 of a bracket 8, secured to one of the arms of the trolley pole harp 9.

10 denotes a motor casing secured to the end wall 11 of an indicator adapted to be located in the car or vehicle provided with the trolley pole 4, the indicator being located at a conspicuous place within the car or vehicle. The motor casing 10 contains a motor having the armature shaft 12 thereof provided with a wheel 13 having a notch 14 in the periphery thereof.

15 denotes a magnet carried by the base 16 of the motor and this magnet has a binding post 17 connected by the wire 18 to the bracket 8 of a trolley pole, the wire being carried within the pole or exteriorly thereof, and to prevent the circuit through said wire interfering with the circuit through the pole, the wire is insulated, also the bracket 8. A switch 18$^a$ is located at a convenient point between the post 17 and the bracket 8 for controlling the electric circuit and the operation of the motor 10.

19 denotes a binding post carried by the base 16 adjacent to the magnet 15, said post being connected by a wire 20 to one of the binding posts 21 of the motor 10, the other binding post 22 being connected by a wire 23 to the car or vehicle frame whereby it will be grounded. The binding post 19 has an extension 24 and adapted to contact with this extension is an extension 25 of an armature 26 adapted to be attracted by the magnet 15, said armature having connection 27 to a source of current supply. When the shoe 6 engages the bracket 8 the magnet 15 will be sufficiently energized to attract the lower end of the armature 26. The armature 26 is pivotally supported by a pin 28, carried by the motor and the upper end of the armature has a tooth 29 adapted to engage in the notch 14 and hold the wheel 13 and the armature shaft 12. The tooth 29 is normally retained in the notch 14 by a flat curved spring 30, carried by the end of the motor casing.

The indicator casing comprises a front wall 31, a rear wall 32, a bottom wall 33, a top wall 34, an end wall 35 together with the end wall 11, said casing being substantially rectangular in cross section with the top and bottom walls 34 and 33 provided with longitudinal semi-cylindrical housings 36 and 37, said housings being located adjacent to the front and rear walls 31 and 32. The upper and lower edges of the casing at the front and rear walls are rounded and revolubly mounted in said casing at the upper and lower edges of the walls 31 and 32 are feed rollers 38 and 39 having the spindles 40 thereof journaled in the end walls 11 and 35. The rollers 38 are adapted to revolve in the same direction and the rollers 39 in same direction as the rollers 38. All of the rollers adjacent to the ends thereof are provided with equally spaced radially disposed pins 41 adapted to engage in the openings or perforations 42 provided therefor in the longitudinal edges of an endless apron 43, said apron consisting of flexible sections having the upper and lower edges thereof pivotally connected together, as at 44. The sections of the apron are preferably made of very thin flexible sheet metal. The apron is of a considerable length and the greater portion of the same is stored in a folded position in the upper and lower parts of the casing. The upper folded sections of the apron are supported centrally of the casing upon an endless belt 45 arranged upon two rollers 46 and 47, said rollers being arranged longitudinally of the casing with the roller 47 having the spindle 48 thereof protruding from the end wall 35. The endless belt 45 has small teats or lugs 49 adapted to engage the lower edges of the folded sections of the apron 43 and intermittently move said folded sections. The belt 45, at the point where the folded sections are held, is supported by a longitudinal bar 50 extending from the end wall 11 to the end wall 35.

The folded sections of the apron 43 in the lower part of the indicator casing are intermittently moved through the medium of a belt 51 arranged upon rollers 52 and 53 revolubly mounted in a housing 54 arranged longitudinally of the bottom wall 33, said bottom wall having longitudinal slots 55 through which the belt 51 passes to ride upon the bottom wall 33 and support the lower edges of the folded apron sections. The belt 51 has teats or lugs similar to the belt 45. The roller 53 has a spindle 56 thereof protruding from the end wall 35.

Arranged longitudinally of the indicator casing adjacent to the rollers 46 and 47 are rock shafts 57 and 58, said shafts having the outer ends thereof provided with arms 59 and 60, the arm 59 being connected to the arm 60 by coiled retractile springs 61. The purpose of these springs is to normally retain the arms 59 and 60 in engagement with cams 62 and 63 mounted upon the spindles 40 and associated with the rollers 38 and 39 respectively. The rock shafts 57 and 58 adjacent to the inner sides of the walls 11 and 35 are provided with holding members 64 and 65 respectively adapted to engage the belt 45 and hold the edges of the folded apron sections that engage said belt.

Journaled in the end walls 11 and 35 and concentrically of the housings 36 and 37 are shafts 66 and 67. These shafts at the inner sides of the walls 11 and 35 are provided with cranks 68 connected by longitudinal rods 69, and these rods are adapted to engage the apron 43 and assist in folding and guiding the sections of the apron in the upper and lower parts of the indicator casing.

The spindles 40 of the feed rollers 38 and 39 of the rear part of the casing are provided with gear wheels 70 meshing with gear wheels 71 mounted upon the shafts 66 and 67 at the rear part of the casing, and these shafts are provided with sprocket wheels 72 over which pass endless sprocket chains 73 and 74ª, the sprocket chain 73 passing over the sprocket wheel 74 mounted upon the shafts 66 in the forward part of the casing. The sprocket chain 74 passes over a sprocket wheel 75 mounted upon the shaft 67 in the forward part of the casing, and the shafts 66 and 67 just referred to, are provided with gear wheels 76 meshing with gear wheels 77 mounted upon the spindles 40 of the feed rollers 38 and 39 in the forward part of the casing. The spindles 40 are provided with sprocket wheels 78 and over said sprocket wheels passes an endless sprocket chain 79, whereby the feed rollers 38 and 39 in the forward part of the indicator casing will rotate in unison. The shaft 66 in the rear part of the casing is coupled or suitably connected to the armature shaft 12 of the motor 10.

The sprocket chain 74 passes over a sprocket wheel 80 mounted upon a shaft 81 revolubly supported by the end wall 35 of the indicator casing. The shaft 81 is provided with a gear wheel 82 meshing with a gear wheel 83 mounted upon a shaft 84, journaled in the end wall 35. The hub of the gear wheel 83 has a radially disposed arm 85 adapted to engage a gear wheel 86 mounted upon the shaft 48 of the roller 47 and intermittently move said gear wheel. The hub of the sprocket wheel 80 is provided with a radially disposed arm 87 adapted to engage and intermittently move a gear wheel 88 mounted upon the shaft 56 of the roller 53. Upon the endless sectional apron 43, is printed, marked or otherwise placed the names of streets, avenues and stations, and it is in this connection that advertisements can also be arranged between the names of streets. In order that the apron can be observed, the front side of the casing is provided with a window 89 normally closed by a transparent plate 90.

Operation: The trolley hangers 1 adjacent to each street, avenue or station are provided with shoes 6, whereby the motor 10 will be placed in operation to operate the street indicator in sufficient time to display the name of the street or station being approached by the car or vehicle. When the shoe 6 contacts with the bracket 8 the magnet 15 attracts the armature 26 to close a circuit through the motor releasing the wheel 13 and allowing the motor to operate and make one revolution of the shaft 12. After one revolution has been made the motor will be locked until the bracket 8 engages the next shoe 6. When the shaft 12 makes one revolution a similar movement is imparted to the shaft 66 in the rear part of the indicator casing and the whole train of gear wheels is placed in motion, whereby the feed rollers 38 and 39 will make one complete revolution. As these feed rollers are moved the apron 43 is shifted and two sections of said apron move past the window 89. As the sections of the apron are pivotally connected together, the rods 69 of the shafts 66 and 67 will assist said sections in folding and in properly engaging the feed rollers. The cams 62 and 63 are adapted to shift the arms 59 and 60, whereby the holding members 64 and 65 will be lowered at the ends of the belt 45 to allow a folded section to rest upon the belt and to leave the belt. In order that the folded sections of the apron can be successively moved the belts 45 and 51 are intermittently moved through the medium of the arms 85 and 87 engaging the gear wheels 86 and 88 respectively.

It is thought that the operation and utility of the street indicator will be apparent without further description and that the manner in which the flexible sections of the apron fold will be understood.

The indicator in its entirety can be made of light and durable metal and of a sufficient size to clearly display the names or advertisements carried by the outer side of the apron.

What I claim is:—

1. In a street car indicator, a casing having a window, feed rollers revolubly mounted in said casing, an endless flexible sectional apron adapted to be shifted past said window by said feed rollers and having sections thereof folded in said casing, a motor carried by said casing and adapted to revolve said feed rollers, a trolley attachment adapted to control the operation of said motor, and means including belts for moving the folded sections of said apron within said casing.

2. In a street indicator for cars, a casing having a window, feed rollers arranged in said casing, an endless sectional apron adapted to be shifted by said rollers past said window and having sections thereof folded in said casing, endless belts supporting the folded sections of said apron within said casing, holding members movably arranged within said casing for retaining said sections upon said belts and adapted to be actuated by a movement of said feed rollers, and means including a motor adapted to operate said feed rollers and said belts.

In testimony whereof I affix my signature in the presence of two witnesses.

HERMANN WILMS.

Witnesses:
 MAX H. SROLOVITZ,
 CHRISTINA T. HOOD.

---

Copies of this patent may be obtained for five cents each, by addressing the "Commissioner of Patents, Washington, D. C."